No. 627,109. Patented June 20, 1899.
A. B. FORREST.
FLY TRAP.
(Application filed Nov. 12, 1898.)

(No Model.)

Witnesses
Inventor
A. B. Forrest,
Attorneys

UNITED STATES PATENT OFFICE.

ALFRED B. FORREST, OF GREENLEAF, KANSAS.

FLY-TRAP.

SPECIFICATION forming part of Letters Patent No. 627,109, dated June 20, 1899.

Application filed November 12, 1898. Serial No. 696,266. (No model.)

*To all whom it may concern:*

Be it known that I, ALFRED B. FORREST, a citizen of the United States, residing at Greenleaf, in the county of Washington and State of Kansas, have invented a new and useful Fly-Trap, of which the following is a specification.

This invention relates generally to fly-traps, and more particularly to a screen-trap into which the flies are induced to crawl by the employment of seductive bait.

The object of the invention is to provide a trap of this character which shall be exceedingly cheap and simple in construction and easily manipulated by any one familiar with household appliances and will let flies escape from a screen door or window.

With this object in view the invention consists in the peculiar construction of the several parts and their novel combination or arrangement, all of which will be fully described hereinafter and pointed out in the claims.

Figure 1:
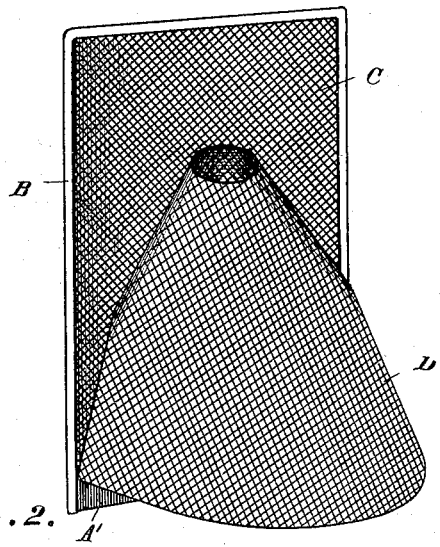
Figure 2:
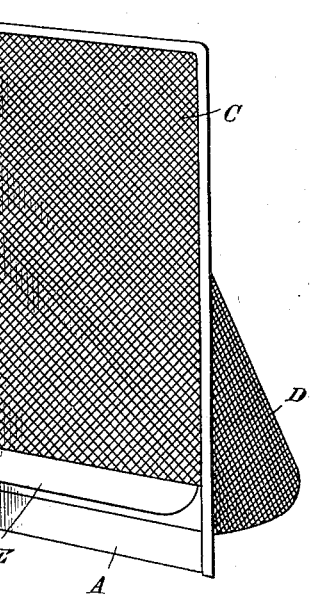
Figure 3:
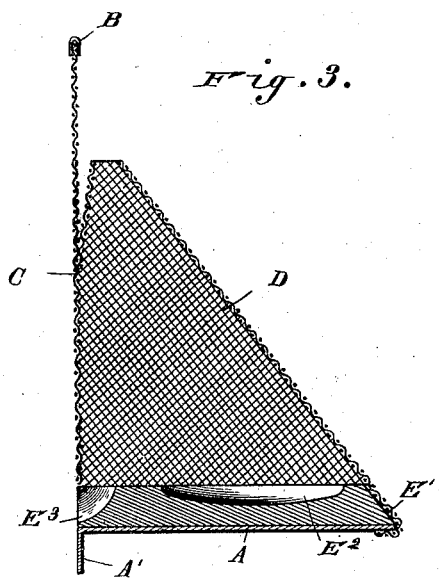
Figure 4:
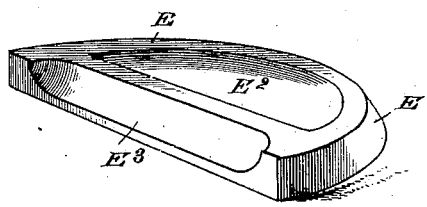

In the drawings forming part of this specification, Figure 1 is a perspective view of a trap constructed in accordance with my invention. Fig. 2 is a similar view showing the opposite side. Fig. 3 is a vertical sectional view, and Fig. 4 is a detail perspective view of the bait pan or dish.

In constructing a trap in accordance with my invention I employ a base A, of tin or other suitable material, which base is essentially semicircular in shape and is turned down or flanged at its straight edge, as shown at A', and attached to the flanged edge of said base is a light wire frame B, rectangular in shape and carrying a screen C, said screen extending nearly, but not entirely, to the base A, thereby leaving an opening between the end of screen C and base A, the purpose of which will be explained hereinafter.

An essentially cone-shaped screen D is attached to the base A and also connected to the screen C, except at the top, thereby providing a screen-trap having a flat semicircular base A, a straight side C, and an essentially conical side D, which has a contracted opening in the top, as shown at D', the top of cone being separate from the screen C.

The bait pan or dish E is preferably made of wood, semicircular in shape to fit the base and tapered along its curved edge, as shown at E', in order to fit snugly beneath the conical portion of the trap. The body of the pan or dish is provided with a depression or hollow $E^2$, in which the bait—such as molasses, sugar, or other sweet material—is placed. The bait pan or dish E is slid upon the base through the opening between the base and screen C. In order to permit the passage of flies and other insects into the trap, the straight edge of the dish or pan is cut away or curved out, as shown at $E^3$, said cut-away or curved-out portion extending nearly, but not quite, to the edges of the dish or pan, as most clearly shown, thereby preventing the escape of the flies or insects.

A trap constructed in accordance with my invention can be used in connection with any window or door screen, and inasmuch as it is exceedingly cheap, simple, and efficient it will be seen that it accomplishes all of the objects for which it was intended.

Having thus fully described my invention, what I claim as new, and desire to secure by Letters Patent of the United States, is—

1. A fly-trap comprising a straight screen side, a semicircular base, and a conical side arranged and connected as described, and a bait pan or dish arranged upon the base and adapted to slide beneath the straight screen, substantially as shown and described.

2. A fly-trap comprising a semicircular base, a frame attached to said base and carrying a screen, an essentially conical-shaped screen portion connected to the base and flat screen portion, but separated at the top, and a bait dish or pan arranged upon the base and having a beveled or cut-away edge, substantially as and for the purpose described.

3. A fly-trap comprising a semicircular base having its straight edge flanged, a frame attached to said flanged edge and carrying a screen, an essentially conical-shaped screen portion attached to the base and straight screen, but separate at the top, and the bait-pan adapted to be arranged upon the base and shaped to fit upon the same, said bait dish or pan having a depression or hollow to receive the bait, and a cut-away, curved or beveled straight edge adapted to permit the entrance of flies or other insects, substantially as shown and described.

ALFRED B. FORREST.

Witnesses:
WM. J. TOBEY,
JAMES S. AYRES.